(12) United States Patent
Zhou et al.

(10) Patent No.: US 11,409,347 B2
(45) Date of Patent: Aug. 9, 2022

(54) METHOD, SYSTEM AND STORAGE MEDIUM FOR PREDICTING POWER LOAD PROBABILITY DENSITY BASED ON DEEP LEARNING

(71) Applicant: Hefei University of Technology, Anhui (CN)

(72) Inventors: Kaile Zhou, Anhui (CN); Zhifeng Guo, Anhui (CN); Shanlin Yang, Anhui (CN); Pengtao Li, Anhui (CN); Lulu Wen, Anhui (CN); Xinhui Lu, Anhui (CN)

(73) Assignee: Hefei University of Technology, Hefei (CN)

( * ) Notice: Subject to any disclaimer, the term of this patent is extended or adjusted under 35 U.S.C. 154(b) by 827 days.

(21) Appl. No.: 16/284,064

(22) Filed: Feb. 25, 2019

(65) Prior Publication Data
US 2019/0265768 A1 Aug. 29, 2019

(30) Foreign Application Priority Data

Feb. 24, 2018 (CN) .......................... 201810157119.8

(51) Int. Cl.
*G06F 1/28* (2006.01)
*G06N 20/00* (2019.01)
*G06N 7/00* (2006.01)

(52) U.S. Cl.
CPC .............. *G06F 1/28* (2013.01); *G06N 7/005* (2013.01); *G06N 20/00* (2019.01)

(58) Field of Classification Search
None
See application file for complete search history.

(56) References Cited

U.S. PATENT DOCUMENTS 10,879,702 B2 * 12/2020 Bou-Zeid ................ H02J 3/386

OTHER PUBLICATIONS

Shalev-Shwartz et al, "Stochastic Methods for ℓ 1-regularized Loss Minimization", Journal of Machine Learning Research 12 (2011) 1865-1892 (Year: 2011).*
He et al, "Short-term power load probability density forecasting method using kernel-based support vector quantile regression and Copula theory", Applied Energy 185 (2017) 254-266, http://dx.doi.org/10.1016/j.apenergy.2016.10.079 (Year: 2017).*

(Continued)

*Primary Examiner* — Li B. Zhen
*Assistant Examiner* — Leah M Feitl

(57) ABSTRACT

The disclosure provides a method, a system and a storage medium for predicting power load probability density based on deep learning. The method comprises: S101, collecting power load data of a user, meteorological data and air quality data in a preset historical time period, and dividing the collected data into a training set and a test set; S102, determining a deep learning model for predicting power load; S103, inputting the test set into the deep learning model for predicting power load, and obtaining power load prediction data of the user at different quantile points in a third time interval; S104, performing kernel density estimation and obtaining a probability density curve of the power load of the user in the third time interval.

10 Claims, 5 Drawing Sheets

(56) References Cited

OTHER PUBLICATIONS

Din et al, "Short Term Power Load Forecasting Using Deep Neural Networks", 2017 International Conference on Computing, Networking and Communications (ICNC): Green Computing, Networking, and Communications (Year: 2017).*

Ouyang et al, "A Deep Learning Framework for Short-term Power Load Forecasting", retrieved from https://www.researchgate.net/publication/321417609_A_Deep_Learning_Framework_for_Short-term_Power_Load_Forecasting (Year: 2017).*

Zili et al, "An Ultra-Short Term Load Forecasting Method Based on Improved Human Comfort Index", 2017 4th International Conference on Electrical and Electronic Engineering (ICEEE), 2017, pp. 82-86, doi: 10.1109/ICEEE2.2017.7935797. (Year: 2017).*

Weglarczyk, "Kernel density estimation and its application", Jan. 2018 ITM Web of Conferences 23(2):00037, retrieved from https://www.researchgate.net/publication/328785939_Kernel_density_estimation_and_its_application (Year: 2018).*

* cited by examiner

METHOD, SYSTEM AND STORAGE MEDIUM FOR PREDICTING POWER LOAD PROBABILITY DENSITY BASED ON DEEP LEARNING

CROSS-REFERENCE TO RELATED APPLICATIONS

This application claims priority from Chinese Patent Application No. 201810157119.8, filed on Feb. 24, 2018, which is hereby incorporated by reference in their entireties.

TECHNICAL FIELD

The disclosure relates to electricity technology, in particular to a method, a system and a storage medium for predicting power load probability density based on deep learning.

BACKGROUND OF THE INVENTION

With the continuous development of the electric power system, the electric power system is more and more important for the economic development of a society. With the continuous improvement of the power grid technology and the increase demand of the economy and society for electric power, the current power energy service is already covered multiple fields. In this background, the normal operation of the power grid system is very important, and the probability distribution situation of the power load has great significance for the operation of the power grid system, and therefore, a solution which can predict the probability distribution situation of the power load is needed.

SUMMARY OF THE INVENTION

(1) Technical Problem Solved

Aiming at the defects in the current technology, the disclosure provides a method, a system and a storage medium for predicting power load probability density based on deep learning, which can determine the probability distribution situation of the power load of the user in the future time period.

(2) Technical Solutions

In order to achieve the aim, the disclosure is realized through the following technical solutions:

In the first aspect, the embodiment of the disclosure provides a method for predicting power load probability density based on deep learning, the method is executed by a computer, the method including:

S101, collecting power load data of a user, meteorological data and air quality data where the user lives in a preset historical time period, and dividing the collected data into a training set and a test set, wherein the historical time period comprises a first time interval and a second time interval which is later than the first time interval, and the training set is data in the first time interval, the test set is data in the second time interval;

S102, determining a deep learning model for predicting power load according to the training set and the test set;

S103, inputting the test set into the deep learning model for predicting power load, and obtaining power load prediction data of the user at different quantile points in a third time interval, wherein the third time interval is a preset time interval in a future time period;

S104, performing kernel density estimation according to power load prediction data of the user at different quantile points in the third time interval, and obtaining a probability density curve of the power load of the user in the third time interval.

In the second aspect, the embodiment of the disclosure provides a system for predicting power load probability density based on deep learning, the system comprises a computer, and the computer including:

at least one storage unit;
at least one processing unit;
wherein at least one instruction is stored in the at least one storage unit, and the at least one instruction is loaded and executed by the at least one processing unit to achieve the following steps:

S101, collecting power load data of a user, meteorological data and air quality data where the user lives in a preset historical time period, and dividing the collected data into a training set and a test set, wherein the historical time period comprises a first time interval and a second time interval which is later than the first time interval, and the training set is data in the first time interval, the test set is data in the second time interval;

S102, determining a deep learning model for predicting power load according to the training set and the test set;

S103, inputting the test set into the deep learning model for predicting power load, and obtaining power load prediction data of the user at different quantile points in a third time interval, wherein the third time interval is a preset time interval in a future time period;

S104, estimating kernel density according to power load prediction data of the user at different quantile points in the third time interval, and obtaining a probability density curve of the power load of the user in the third time interval.

In a third aspect, the embodiment of the disclosure provides a computer readable storage medium, and at least one instruction is stored in the medium, the at least one instruction is loaded and executed by a processor to achieve the method mentioned above.

(3) Beneficial Effects

The embodiments of the disclosure provide a method, a system and a storage medium for predicting power load probability density based on deep learning, which has the following beneficial effects:

The embodiments of the disclosure adopt a deep learning model for carrying out prediction on the power load at different quantile points. The deep learning is used as an artificial intelligence method, comparing with a traditional time series method and a machine learning method, the prediction accuracy of the method is higher. The data adopted in the deep learning process is not only power load data, but also meteorological data and air quality data. Due to the fact that the weather condition and the air quality may influence the behavior of people, and further influence the electricity consumption of people, as a result the load can be affected eventually, and therefore the prediction accuracy can be further improved when the meteorological data and the air quality data are taken into account. Kernel density estimation is performed which is based on the power load prediction data with higher accuracy, so that a probability density curve with higher accuracy is obtained, and therefore the probability distribution situation of the power load of the user in the future time period is obtained.

BRIEF DESCRIPTION OF THE DRAWINGS

In order to illustrate the technical solutions more clearly in the embodiments of the disclosure or in the current technology, the accompanying drawings required to be used in the description of the embodiments or the current technology are introduced briefly hereinafter, the accompanying drawings in the following description are only some embodiments of the disclosure, those skilled in the art will be understood that other drawings can be obtained according to the accompanying drawings without creative efforts.

DETAILED DESCRIPTION OF EMBODIMENTS

In order to illustrate the aims, technical solutions and advantages of the embodiments of the disclosure more clearly, the embodiments of the disclosure will hereinafter be described clearly and completely in conjunction with accompanying drawings in the embodiments of the disclosure. Obviously, the embodiments described herein are part of the embodiments of the disclosure rather than all of the embodiments. Based on the embodiments of the disclosure, all the other embodiments obtained by those ordinary skilled in the art without any creative efforts belong to the protection scope of the disclosure.

Figure 1:
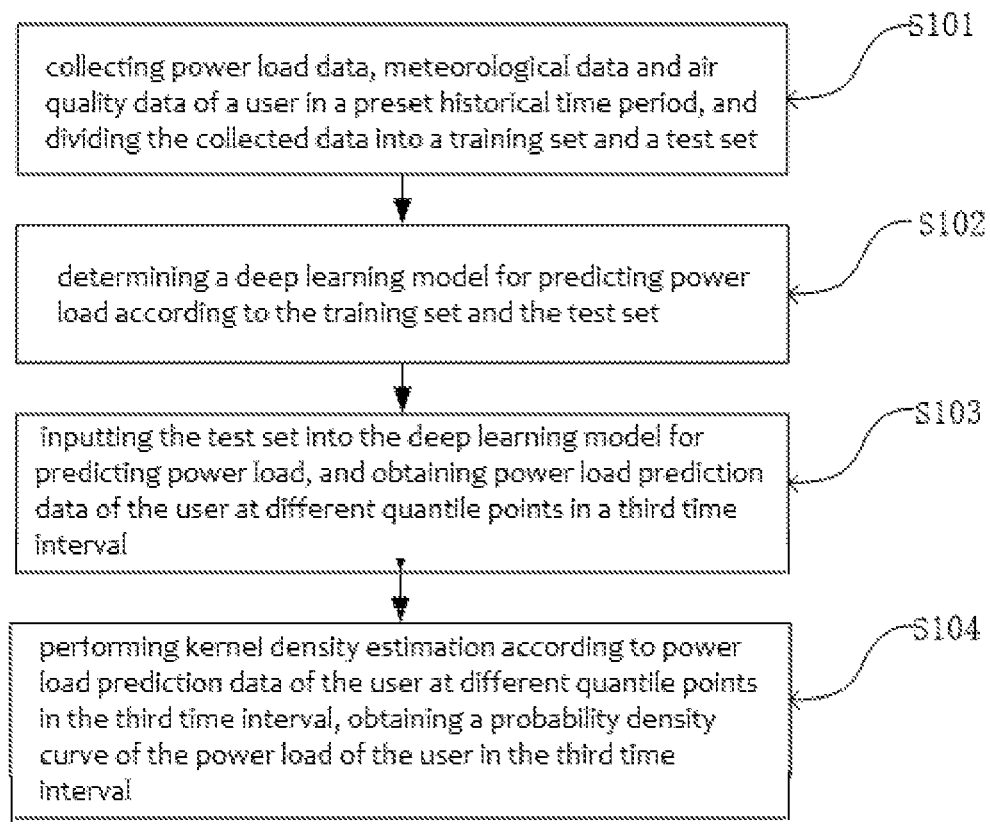
FIG. 1 shows a flow diagram of a method for predicting power load probability density based on deep learning according to an embodiment of the disclosure.

In the first aspect, the embodiment of the disclosure provides a method for predicting power load probability density based on deep learning, the method is executed by a computer. As shown in FIG. 1, the method comprises the following steps:

S101, Collecting power load data of a user, meteorological data and air quality data where the user lives in a preset historical time period, and dividing the collected data into a training set and a test set, wherein the historical time period comprises a first time interval and a second time interval which is later than the first time interval, and the training set is data in the first time interval, the test set is data in the second time interval.

It is understood that the power load data is the power consumption data of the user in a historical time period and meteorological data, i.e. weather data.

In actual application, the historical time period, the first time interval and the second time interval can be selected according to needs, for example, the 24 hours of a day, the previous day (namely, yesterday) and the current day are used as a historical time period, power load data generated in the two days, weather data and air quality data of the two days are collected. The previous day is used as the first time interval, and the current day is used as the second time interval, so that the relevant data form the previous day forms a training set, and the relevant data from the current day forms a test set.

In actual application, before the collected data is divided into the training set and the test set, the method further comprises the steps of cleaning the collected data, so that missing values and the abnormal values can be removed, and the subsequent deep learning and prediction can be prevented from being influenced. The data obtained after cleaning can also be subjected to format conversion, converting the data into a supervised learning data format, so as to execute a subsequent deep learning and testing process.

S102, determining a deep learning model for predicting power load according to the training set and the test set.

In specific implementation, a plurality of deep learning models are determined, and an optional model determination process is introduced below:

S1021, performing initialization setting for the network structure and model parameters of the deep learning model.

It can be understood that initializing a network structure and model parameters of the deep learning model, in fact, is a process of initialization setting of the deep learning model to obtain an initial deep learning model, the specific initialization setting can refer to the following table 1:

TABLE 1

Initialization setting table

| Parameters | Initial values |
| --- | --- |
| Number of the hidden layers | 3 |
| Node number of each layer | [45, 200, 200, 200, 1] |
| Maximum number of iterations | 500 |
| Regularization parameter L1 | 0.01 |
| Regularization parameter L2 | 0.01 |
| Activation function | Rectifer function |
| Learning rate | 0.1 |
| Loss function | Loss function of quantile point |

As can be seen from the above table 1, in the network structure of the initial deep learning model, there are three hidden layers, and the node number of an input layer, the three hidden layers and an output layer are respectively 45, 200, 200, 200, 1, the maximum number of iterations in the deep learning process is 500, and the two regularization parameters are 0.01, the activation function is Rectifer function, the learning rate is 0.1, and the loss function of quantile point is selected as a loss function.

It is understood that the deep learning model can be initialized only according to table 1 at the moment, and the adjustment of each parameter can be involved in the process hereinafter.

S1022, inputting the training set into the current deep learning model, and through a deep learning of the current deep learning model, obtaining power load prediction data of the user at different quantile points in the second time interval for each training sample in the training set.

It can be understood that if the S1022 is performed for the first time, the current deep learning model is an initial deep learning model, and if the S1022 is performed for the second and third time, the current deep learning model is a deep learning model obtained after the structure and/or the parameters of a previous deep learning model are adjusted.

It is understood that different quantile points correspond to different power load ranges, so that in the follow-up process, distribution situation of different power load prediction values can be obtained for each training sample. The quantile point can be represented by τ, and the value of the quantile point can be selected according to needs, for example, τ=0.01, 0.02, . . . , 0.99. For each training sample, power load prediction data at different quantile points can be obtained through deep learning. For example, the number of the quantile points is n, and then for each training sample in the training set, the power load prediction data at n quantile points can be obtained.

It can be understood that the input data of the deep learning model is a training set, and the training set is the data collected in the first time interval, and the data obtained after deep learning is the power load prediction data of the users at different quantile points in the second time interval, so that the obtained data is a prediction, carried out by the deep learning model, of power load at different quantile points in the second time interval based on data of the first time interval. That is, through the relevant data in the first time interval, the deep learning model can predict the power load at different quantile points in the second time interval.

For example, the power load data, the meteorological data and the air quality data of yesterday are formed a training set, and the power load data, the meteorological data and the air quality data of today are formed a test set. The training set is input into the current deep learning model, so that the prediction result of the power load at different quantile points of today is obtained.

In the specific implementation, the current deep learning model is various in deep learning mode, for example, the current deep learning model is subjected to deep learning by adopting the following formula, the power load prediction data of the user at the quantile point τ in the second time interval can be obtained:

$$Z_\tau = \min\left\{\frac{1}{n}\sum_{i=1}^{n}\rho_\tau[y_i, f(x_i; w)] + \lambda J(w)\right\}$$

in the formula, $x_i$ is the ith training sample in the training set, n is the number of training samples in the training set, $\rho_\tau(\ )$ is a loss function corresponding to a quantile point τ, λ is a regularization coefficient, J(w) is a regular term, w is a weight parameter, $y_i$ is the ith test sample in the test set, $Z_\tau$ is the power load prediction data of the user at a quantile point τ in the second time interval, f( ) is a power load prediction value output by the current deep learning model based on $x_i$ and current model parameters.

Wherein the regular term J(w) can be determined by the following formula:

$$J(w) = \frac{1}{2}\sum_{k=1}^{K-1}\sum_{j=1}^{p_k}\sum_{l=1}^{p_{k+1}}\{w_{lj}^k\}^2$$

In the formula, $w_{lj}^k$ represents the weight of the ith neuron and the jth neuron connection in the kth layer of the model, K represents the number of the neural layers, and p represents the number of neurons in a corresponding layer, for example, $p_k$ is the number of neurons in the kth layer.

Wherein the loss function corresponding to the quantile point τ can include:

$$\rho_\tau(\mu) = \begin{cases} \tau\mu, & \mu \geq 0 \\ (\tau-1)\mu, & \mu < 0 \end{cases}$$

In the formula, μ is the input variable of the loss function, that is the difference value between $y_i$ and $f(x_i; w)$.

S1023, performing kernel density estimation according to power load prediction data of the user at different quantile points in the second time interval, and obtaining a probability density curve of the power load of the user in the second time interval.

It is to be understood that the kernel density estimation is a estimation algorithm of the probability density, and can be calculated by the following formula:

$$\hat{f}_n(Z_\tau) = \frac{1}{T*h}\sum_{\tau=1}^{T}K\left(\frac{Z - Z_\tau}{h}\right)$$

In the formula, $\hat{f}_n(Z_\tau)$ is the probability density of $Z_\tau$, $Z_\tau$ is the power load prediction data of the user at quantile point τ in the second time interval, T is the number of the quantile points, h is the bandwidth, Z is a value whose distance to $Z_\tau$ is smaller than or equal to h, $$K(a) = \frac{1}{\sqrt{2\pi}}\exp(-a^2/2),$$

and a is an input variable of K( ).

For example, $Z_\tau$ is 5, and h is 2, then Z can be an integer whose distance to 5 is smaller than or equal to 2, for example, 3, 4, 5, 6, 7.

Figure 2:
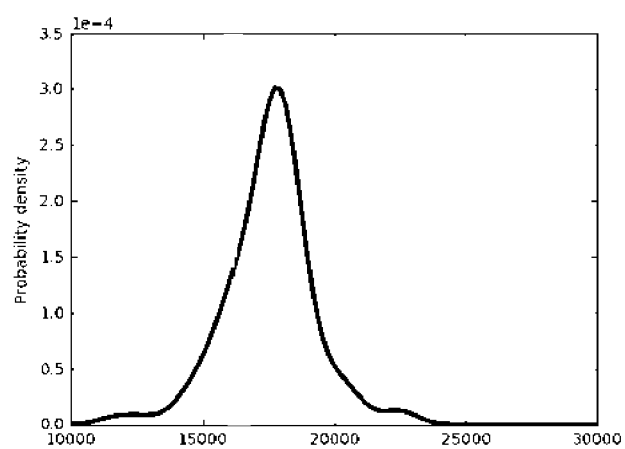
FIG. 2 shows a probability density curve of power load of a user in the second time interval according to an embodiment of the disclosure.

It is understood that for each training sample, the probability density curve of the power load of the user in the second time interval can be obtained, and the curve may reflect the distribution situation of probability density of the power load of the user in the second time interval. As shown in FIG. 2. If n1 training samples are in the training set, then n1 probability density curves can be obtained.

S1024, determining a prediction capability of the current deep learning model according to the probability density curve of the power load of the user in the second time interval and a corresponding test sample in the test set; if the prediction capability meets a preset requirement, using the current deep learning model as a deep learning model for predicting power load and executing S103; or adjusting the network structure and/or model parameters of the current deep learning model and returning to the S1022.

Figure 3:
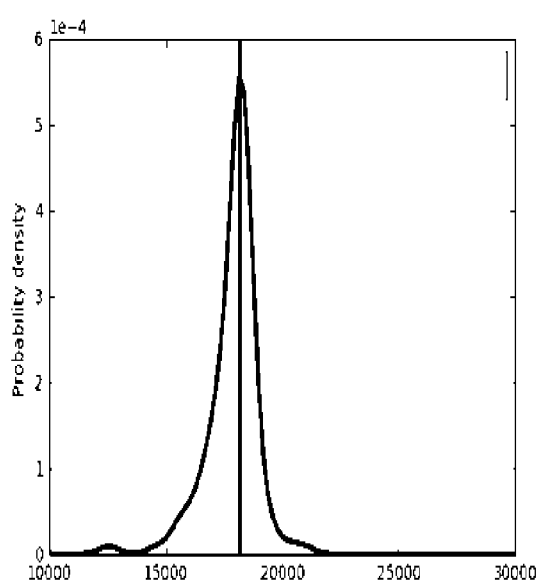
FIG. 3 shows a schematic diagram of a probability density curve of power load of a user in the second time interval matching with a corresponding test sample according to an embodiment of the disclosure.
Figure 4:
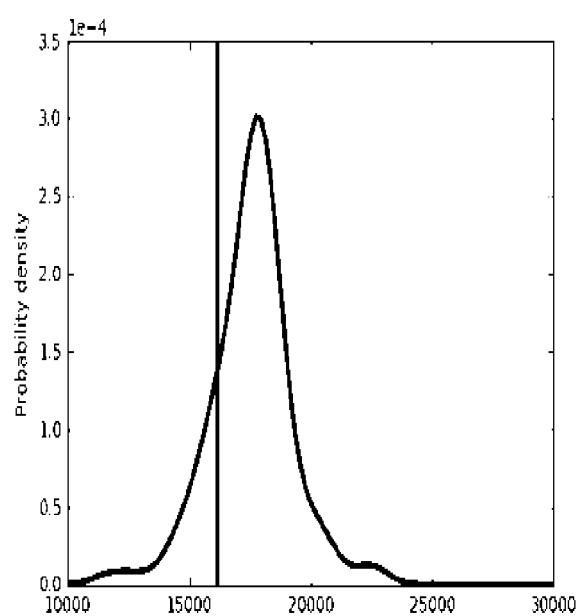
FIG. 4 shows a schematic diagram of a probability density curve of power load of a user in the second time interval not matching with a corresponding test sample according to an embodiment of the disclosure.
Figure 5:
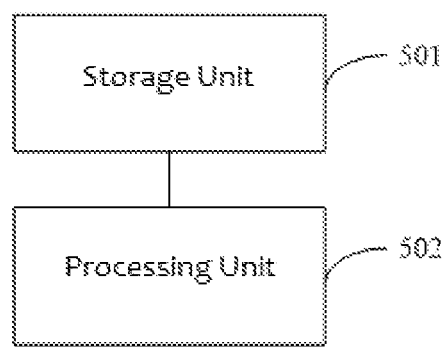
FIG. 5 shows a structural block diagram of a system for predicting power load probability density based on deep learning according to an embodiment of the disclosure.

In this step, there are a plurality of ways for determining the prediction capability of the deep learning model, for example, judging whether the probability density curve of the power load of the user in the second time interval is matched with the corresponding test sample, the term matched refers to whether the power load in the test sample coincides with the maximum value of the probability density curve or the difference value between the power load and the maximum value is within a relatively small range. As shown in FIG. 3, the power load in the test sample is a straight line in FIG. 3, and the power load in the test sample coincides with the maximum value of the probability density curve, that is, it is considered they are matched, and therefore the prediction capability of the current deep learning model meets the preset requirement. As shown in FIG. 4, the difference between the power load in the test sample and the maximum value in the probability density curve is relatively large, it is considered they are not matched, that is, the prediction capability of the current deep learning model is relatively poor, and the preset requirement is not met.

It can be understood that if the prediction capability of the current deep learning model meets the requirements, then there is no need to further adjust the structure and/or the parameters of the current deep learning model, the current deep learning model can be directly used as a final deep learning model. However, if the prediction capability does not meet the requirements, the current deep learning model needs to be adjusted, returning to the S1022, and continuing to iterate until the prediction capability of the deep learning model meets the requirements.

S103, inputting the test set into the deep learning model for predicting power load, and obtaining power load prediction data of the user at different quantile points in a third time interval, wherein the third time interval is a preset time interval in a future time period.

It is understood that the third time interval is a time interval in a future time period and is certainly later than the second time interval, through the relevant data in the second time interval, the deep learning model can predict the power load of different quantile points in the third time period.

For example, the power load data, weather data and air quality data of today are formed a test set, after the test set is input into the final deep learning model, a prediction result of the power load at different quantile points of tomorrow is obtained.

S104, performing kernel density estimation according to power load prediction data of the user at different quantile points in the third time interval, and obtaining a probability density curve of the power load of the user in the third time interval.

In the step, when estimating kernel density according to power load prediction data of the user at different quantile points in the third time interval, the kernel density estimation formula mentioned above can also be adopted:

$$\hat{f}_n(Z_\tau) = \frac{1}{T*h}\sum_{\tau=1}^{T} K\left(\frac{Z-Z_\tau}{h}\right)$$

In the formula, $\hat{f}_n(Z_\tau)$ is the probability density of $Z_\tau$, $Z_\tau$ is the power load prediction data of the user at quantile point τ in the third time interval, T is the number of the quantile points, h is the bandwidth, Z is a value whose distance to $Z_\tau$ is smaller than or equal to h, $$K(a) = \frac{1}{\sqrt{2\pi}}\exp(-a^2/2),$$

and a is an input variable of K( ).

It is understood that it is different from the kernel density estimation formula mentioned above, $Z_\tau$ herein is the power load prediction data of the user at quantile point τ in the third time interval.

It is understood that each test sample in the test set can obtain a corresponding probability density curve. By means of the kernel density estimation formula mentioned above, the probability distribution situation of the power load of the user in the third time interval can be obtained.

The embodiments of the disclosure provide a method for predicting power load probability density based on deep learning, and the method adopts a deep learning model for carrying out prediction on the power load at different quantile points. the deep learning is used as an artificial intelligence method, comparing with a traditional time series method and a machine learning method, the prediction accuracy of the method is higher. The data adopted in the deep learning process is not only power load data, but also meteorological data and air quality data. Due to the fact that the weather condition and the air quality may influence the behavior of people, and further influence the electricity consumption of people, as a result the load can be affected eventually, and therefore the prediction accuracy can be further improved when the meteorological data and the air quality data are taken into account. Kernel density estimation is performed which is based on the power load prediction data with higher accuracy, so that a probability density curve with higher accuracy is obtained, and therefore the probability distribution situation of the power load of the user in the future time period is obtained.

In the second aspect, the embodiment of the disclosure provides a system for predicting power load probability density based on deep learning, the system comprises a computer, and the computer comprising:

at least one storage unit 501;

at least one processing unit 502;

wherein the processing unit, for example a processor, and the storage unit, for example a memory.

wherein at least one instruction is stored in the at least one storage unit 501, and the at least one instruction is loaded and executed by the at least one processing unit 502 to achieve the following steps:

S101, collecting power load data of a user, meteorological data and air quality data where the user lives in a preset historical time period, and dividing the collected data into a training set and a test set, wherein the historical time period comprises a first time interval and a second time interval which is later than the first time interval, and the training set is data in the first time interval, the test set is data in the second time interval;

S102, determining a deep learning model for predicting power load according to the training set and the test set;

S103, inputting the test set into the deep learning model for predicting power load, and obtaining power load prediction data of the user at different quantile points in a third time interval, wherein the third time interval is a preset time interval in a future time period;

S104, estimating kernel density according to power load prediction data of the user at different quantile points in the third time interval, and obtaining a probability density curve of the power load of the user in the third time interval.

In some embodiments, the at least one instruction is loaded and executed by the at least one processing unit to achieve a process for determining a deep learning model for predicting power load comprising:

S1021, performing initialization setting for the network structure and model parameters of the deep learning model;

S1022, inputting the training set into the current deep learning model, and through a deep learning of the current deep learning model, obtaining power load prediction data of the user at different quantile points in the second time interval for each training sample in the training set;

S1023, performing kernel density estimation according to power load prediction data of the user at different quantile points in the second time interval, and obtaining a probability density curve of the power load of the user in the second time interval;

S1024, determining a prediction capability of the current deep learning model according to the probability density curve of the power load of the user in the second time interval and a corresponding test sample in the test set; if the prediction capability meets a preset requirement, using the current deep learning model as a deep learning model for predicting power load and turning to S1023; or adjusting the network structure and/or model parameters of the current deep learning model and returning to the S1022.

In some embodiments, before the at least one instruction is loaded and executed by the at least one processing unit to divide the collected data into the training set and the test set, cleaning process is carried out for the collected data, and the format of the data obtained after the cleaning process is converted into a supervised learning data format.

In some embodiments, the at least one instruction is loaded and executed by the at least one processing unit to achieve the S1022 in which the deep learning is carried out by adopting the following formula:

$$Z_\tau = \min\left\{\frac{1}{n}\sum_{i=1}^{n} \rho_\tau[y_i, f(x_i; w)] + \lambda J(w)\right\}$$

In the formula, $x_i$ is the ith training sample in the training set, n is the number of training samples in the training set, $\rho_\tau(\ )$ is a loss function corresponding to a quantile point $\tau$, $\lambda$ is a regularization coefficient, $J(w)$ is a regular term, w is a weight parameter, $y_i$ is the ith test sample in the test set, $Z_\tau$ is the power load prediction data of the user at a quantile point $\tau$ in the second time interval, $f(\ )$ is a power load prediction value output by the current deep learning model based on $x_i$ and current model parameters.

In some embodiments, the loss function corresponding to quantile point $\tau$ includes:

$$\rho_\tau(\mu) = \begin{cases} \tau\mu, & \mu \geq 0 \\ (\tau-1)\mu, & \mu < 0 \end{cases}$$

In the formula, $\mu$ is the difference value between $y_i$ and $f(x_i; w)$.

In some embodiments, the at least one instruction is loaded and executed by the at least one processing unit to achieve the S104 in which kernel density estimation is carried out by adopting the following formula:

$$\hat{f}_n(Z_\tau) = \frac{1}{T \cdot h}\sum_{\tau=1}^{T} K\left(\frac{Z - Z_\tau}{h}\right)$$

In the formula, $\hat{f}_n(Z_\tau)$ is the probability density of $Z_\tau$, $Z_\tau$ is the power load prediction data of the user at quantile point $\tau$ in the third time interval, T is the number of the quantile points, h is the bandwidth, Z is a value whose distance to $Z_\tau$ is smaller than or equal to h, $$K(a) = \frac{1}{\sqrt{2\pi}}\exp(-a^2/2),$$

and a is an input variable of $K(\ )$.

It is understood that the system for predicting the power load probability density corresponds to the method for predicting the power load probability density provided by the embodiment of the disclosure, and the explanations, examples, the beneficial effects and the like of the related contents may refer to the corresponding contents of the method for predicting the power load probability density, and they are not described in detail herein.

In a third aspect, the embodiments of the disclosure provide a computer readable storage medium, and at least one instruction is stored in the medium, the at least one instruction is loaded and executed by a processor to achieve the method mentioned above.

It should be noted that, in the disclosure, relation terms such as first and second, are merely used to distinguish one entity or operation from another entity or operation, and it is not necessarily required or implied that any actual relationship or sequence should exist between the entities or the operations. Moreover, the terms "comprising" "including," or any other variants thereof are intended to encompass a non-exclusive inclusion, so that a process, a method, an article or a device which include a series of elements does not only include those elements, but also include other elements which are not explicitly listed, or further includes inherent elements of the process, the method, the article or the device. Under the condition that no more limitation exists, the element defined by the statement "comprises a" is not excluded other same elements existing in the process, the method, the article or the device which include the element.

The embodiments mentioned above are merely used to illustrate the technical solutions of the disclosure and are not limited thereto; although the disclosure has been described in detail with reference to the foregoing embodiments, those of ordinary skilled in the art should be understood that: the technical solutions described in the foregoing embodiments can still be modified, or some of the technical features in the technical solutions can still be equivalently replaced; however, the modifications or replacements do not make the essence of the corresponding technical solutions depart from the spirit and scope of the technical solutions of the embodiments of the disclosure.

What is claimed is:

1. A method for predicting power load probability density based on deep learning, the method is executed by a computer, and the method comprising:

S101, collecting power load data of a user, meteorological data and air quality data in a preset historical time period, and dividing the collected data into a training set and a test set, wherein the historical time period comprises a first time interval and a second time interval which is later than the first time interval, and the training set is data in the first time interval, the test set is data in the second time interval;

S102, determining a deep learning model for predicting power load according to the training set and the test set;

S103, inputting the test set into the deep learning model for predicting power load, and obtaining power load prediction data of the user at different quantile points in a third time interval, wherein the third time interval is a preset time interval in a future time period;

S104, performing kernel density estimation according to power load prediction data of the user at different quantile points in the third time interval, and obtaining a probability density curve of the power load of the user in the third time interval;

wherein the step S102 is performed through steps of:

S1021, performing initialization setting for the network structure and model parameters of the deep learning model;

S1022, inputting the training set into the deep learning model, and through a deep learning of the current deep learning model, obtaining power load prediction data of the user at different quantile points in the second time interval for each training sample in the training set S1023, performing kernel density estimation according to power load prediction data of the user at different quantile points in the second time interval, and obtaining a probability density curve of the power load of the user in the second time interval; and S1024, determining a prediction capability of the current deep learning model according to the probability density curve of the power load of the user in the second time interval and a corresponding test sample in the test set if the prediction capability meets a preset requirement, using the current deep learning model as a deep learning model for predicting power load and executing the S103; or adjusting the network structure and/or model parameters of the current deep learning model and returning to the S1022;

wherein the deep learning model is subjected to deep learning by adopting the following formula:

$$Z_\tau = \min\left\{\frac{1}{n}\sum_{i=1}^{n}\rho_\tau[y_i, f(x_i; w)] + \lambda J(w)\right\}$$

wherein $x_i$ is the ith training sample in the training set, n is the number of training samples in the training set, $\rho_\tau(\ )$ is a loss function corresponding to a quantile point $\tau$, $\lambda$ is a regularization coefficient, $J(w)$ is a regular term, w is a weight parameter, $y_i$ is the ith test sample in the test set, $Z_\tau$ is the power load prediction data of the user at a quantile point $\tau$ in the second time interval, $f(\ )$ is a power load prediction value output by the current deep learning model based on $x_i$ and current model parameters.

2. The method according to claim 1, wherein the loss function corresponding to the quantile point $\tau$ comprises :

$$\rho_\tau(\mu) = \begin{cases} \tau\mu, & \mu \geq 0 \\ (\tau-1)\mu, & \mu < 0 \end{cases}$$

wherein, $\mu$ is the difference value between $Y_i$ and $f^{(x}_i; w)$.

3. The method according to claim 1, wherein in the S104, kernel density estimation is performed by adopting the following formula:

$$\hat{f}_n(Z_\tau) = \frac{1}{T*h}\sum_{\tau=1}^{T}K\left(\frac{Z-Z_\tau}{h}\right)$$

wherein $\hat{f}_n(Z_\tau)$ is the probability density of $Z_\tau$, $Z_\tau$ is the power load prediction data of the user at quantile point $\tau$ in the third time interval, T is the number of the quantile points, h is the bandwidth, Z is a value whose distance to $Z_\tau$ is smaller than or equal to h, $$K(a) = \frac{1}{\sqrt{2\pi}}\exp(-a^2/2),$$

and a is an input variable of $K(\ )$.

4. The method according to claim 1, wherein before dividing the collected data into the training set and the test set, the method further comprises:
cleaning the collected data, and converting the format of the data obtained after the cleaning process into a supervised learning data format.

5. The method according to claim 1, wherein before dividing the collected data into the training set and the test set, the method further comprises: cleaning the collected data, and converting the format of the data obtained after the cleaning process into a supervised learning data format.

6. The method according to claim 2, wherein before dividing the collected data into the training set and the test set, the method further comprises:
cleaning the collected data, and converting the format of the data obtained after the cleaning process into a supervised learning data format.

7. The method according to claim 3, wherein before dividing the collected data into the training set and the test set, the method further comprises:
cleaning the collected data, and converting the format of the data obtained after the cleaning process into a supervised learning data format.

8. A system for predicting power load probability density based on deep learning, the system comprises a computer, and the computer comprising :
at least one storage unit;
at least one processing unit;
wherein at least one instruction is stored in the at least one storage unit, and the at least one instruction is loaded and executed by the at least one processing unit to achieve the following steps:

S101, collecting power load data of a user, meteorological data and air quality data where the user lives in a preset historical time period, and dividing the collected data into a training set and a test set, wherein the historical time period comprises a first time interval and a second time interval which is later than the first time interval, and the training set is data in the first time interval, the test set is data in the second time interval;

S102, determining a deep learning model for predicting power load according to the training set and the test set;

S103, inputting the test set into the deep learning model for predicting power load, and obtaining power load prediction data of the user at different quantile points in a third time interval, wherein the third time interval is a preset time interval in a future time period;

S104, estimating kernel density according to power load prediction data of the user at different quantile points in the third time interval, and obtaining a probability density curve of the power load of the user in the third time interval;

wherein the step S102 is performed through steps of:

S1021, performing initialization setting for the network structure and model parameters of the deep learning model;

S1022, inputting the training set into the deep learning model, and through a deep learning of the current deep learning model, obtaining power load prediction data of the user at different quantile points in the second time interval for each training sample in the training set;

S1023, performing kernel density estimation according to power load prediction data of the user at different quantile points in the second time interval, and obtaining a probability density curve of the power load of the user in the second time interval; and S1024, determining a prediction capability of the current deep learning model according to the probability density curve of the power load of the user in the second time interval and a corresponding test sample in the test set if the prediction capability meets a preset requirement, using the current deep learning model as a deep learning model for predicting power load and executing the S103; or adjusting the network structure and/or model parameters of the current deep learning model and returning to the S1022;

wherein the deep learning model is subjected to deep learning by adopting the following formula:

$$Z_\tau = \min\left\{\frac{1}{n}\sum_{i=1}^{n}\rho_\tau[y_i, f(x_i; w)] + \lambda J(w)\right\}$$

wherein $x_i$ is the ith training sample in the training set, n is the number of training samples in the training set, $\rho_\tau(\ )$ is a loss function corresponding to a quantile point $\tau$, $\lambda$ is a regularization coefficient, J(w) is a regular term, w is a weight parameter, $Y_i$ is the ith test sample in the test set, $Z_\tau$ is the power load prediction data of the user at a quantile point $\tau$ in the second time interval, f( ) is a power load prediction value output by the current deep learning model based on $x_i$ and current model parameters.

9. The system according to claim 8, wherein before the at least one instruction is loaded and executed by the at least one processing unit to divide the collected data into the training set and the test set, cleaning process is carried out for the collected data, and the format of the data obtained after the cleaning process is converted into a supervised learning data format.

10. A non-transitory computer readable storage medium, wherein at least one instruction is stored in the medium, and the at least one instruction is loaded and executed by a processor to achieve the method as claimed in claim 1.

* * * * *